(12) United States Patent
Ono

(10) Patent No.: US 10,046,517 B2
(45) Date of Patent: Aug. 14, 2018

(54) RESIN MEMBER

(71) Applicant: FUJI JUKOGYO KABUSHIKI KAISHA, Tokyo (JP)

(72) Inventor: Tsubasa Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/063,096

(22) Filed: Mar. 7, 2016

(65) Prior Publication Data

US 2016/0271868 A1    Sep. 22, 2016

(30) Foreign Application Priority Data

Mar. 19, 2015 (JP) ................. 2015-055936

(51) Int. Cl.
| | | |
|---|---|---|
| B32B 3/30 | (2006.01) | |
| B29C 65/02 | (2006.01) | |
| B29C 65/00 | (2006.01) | |
| B29C 65/08 | (2006.01) | |
| B32B 3/26 | (2006.01) | |

(52) U.S. Cl.
CPC ........ B29C 66/30221 (2013.01); B29C 65/08 (2013.01); B29C 66/1122 (2013.01); B29C 66/21 (2013.01); B29C 66/43 (2013.01); B29C 66/7392 (2013.01); B29C 66/8322 (2013.01); B32B 3/26 (2013.01); B32B 3/30 (2013.01); *B29C 66/71* (2013.01); *B29C 66/721* (2013.01); *B29C 66/7212* (2013.01); *Y10T 428/2457* (2015.01); *Y10T 428/24355* (2015.01); *Y10T 428/24612* (2015.01)

(58) Field of Classification Search
CPC ................. B29C 66/30221; B29C 66/30223
See application file for complete search history.

(56) References Cited

U.S. PATENT DOCUMENTS

| | | | |
|---|---|---|---|
| 7,556,285 B1* | 7/2009 | Hayashi | B60R 21/2165 280/728.3 |
| 2010/0079970 A1* | 4/2010 | Prest | B29C 65/645 361/807 |

(Continued)

FOREIGN PATENT DOCUMENTS

| | | | | |
|---|---|---|---|---|
| DE | 102008017922 | * | 1/2009 | ......... B29C 65/1635 |
| DE | 102012218827 | * | 4/2014 | |

(Continued)

OTHER PUBLICATIONS

Machine translation of JP 2000/179103 A, obtained from Industrial Digital Property Library of the JPO dated Jun. 6, 2017.*

(Continued)

*Primary Examiner* — Z. Jim Yang
(74) *Attorney, Agent, or Firm* — Chip Law Group

(57) ABSTRACT

A resin member contains a thermoplastic resin and is bonded to another resin member by ultrasonic welding. The resin member includes projections that are projected from a surface of a bonding target section of the resin member and melted by application of contact pressure during the ultrasonic welding. The projections include projections having different projection heights from the surface of the bonding target section.

17 Claims, 10 Drawing Sheets

(56) References Cited

U.S. PATENT DOCUMENTS

| | | | |
|---|---|---|---|
| 2011/0111182 A1* | 5/2011 | Stay | H05K 3/107 428/173 |
| 2011/0311764 A1* | 12/2011 | Hulseman | B22F 3/17 428/131 |
| 2012/0013147 A1* | 1/2012 | Ezaka | B29C 65/06 296/181.5 |
| 2013/0078429 A1* | 3/2013 | Sayama | B23K 20/122 428/172 |
| 2013/0115420 A1* | 5/2013 | Park | B32B 3/30 428/141 |
| 2015/0041070 A1* | 2/2015 | Wang | B29C 65/4815 156/580 |
| 2015/0168610 A1* | 6/2015 | Fukui | B29C 33/424 428/141 |
| 2016/0038993 A1* | 2/2016 | Li | B21J 15/025 29/432.2 |
| 2016/0167288 A1* | 6/2016 | Rodgers | B29C 65/08 156/73.1 |
| 2016/0250804 A1* | 9/2016 | Wang | B29C 65/606 403/267 |
| 2017/0036393 A1* | 2/2017 | Ishii | B29C 65/08 |
| 2017/0210087 A1* | 7/2017 | Wang | B32B 3/30 |

FOREIGN PATENT DOCUMENTS

| | | | | |
|---|---|---|---|---|
| EP | 2163373 A2 | * | 3/2010 | B29C 65/1635 |
| JP | 62-130221 U | | 8/1987 | |
| JP | 02-135971 U | | 11/1990 | |
| JP | 10-156555 A | | 6/1998 | |
| JP | 11344016 A | * | 12/1999 | |
| JP | 2000179103 A | * | 6/2000 | B29C 65/08 |

OTHER PUBLICATIONS

Method Using Regular Polygons, Jounral of Onine Mathematics and its Applications, vol. 7, 2007, obtained from http://www.maa.org/external_archive/joma/Volume7/Aktumen/Polygon.html on Jun. 1, 2017.*

Office Action received for Japanese Patent Application No. 2015-055936, dated Jun. 14, 2016, 5 Pages of Office Action including 3 pages of English translation.

* cited by examiner

RESIN MEMBER

CROSS-REFERENCE TO RELATED APPLICATIONS

The present application claims priority from Japanese Patent Application No. 2015-055936 filed on Mar. 19, 2015, the entire contents of which are hereby incorporated by reference.

BACKGROUND

1. Technical Field

The present invention relates to a resin member that contains a thermoplastic resin and is bonded to another resin member by ultrasonic welding.

2. Related Art

Structural parts of automobile bodies have conventionally been formed of metal materials such as steel materials. These days, to reduce the weight of the car body, structural parts that are formed of resin materials such as a carbon fiber-reinforced plastic (CFRP) are coming into use. The methods for joining parts made of metal materials are roughly categorized into three methods. One is outfitting joining using bolts or the like, another is adhesion using an adhesive, and the other is fusion bonding by melting metal. Also when parts are formed of resin materials, strong bonding similar to that for parts made of metal materials is necessary. In particular, in the case of parts made of resin materials containing thermoplastic resins, a welding technology in which resin materials are melted to be bonded together is counted on.

Welding is a bonding method capable of strongly bonding parts without using a third interposed object as in outfitting joining using bolts or the like and adhesion using an adhesive. Among the types of welding, ultrasonic welding can melt the resin only in a portion that is intended to be bonded locally, and therefore has high applicability, such as with no need to consider the entire shapes of the parts. However, when parts made of resin materials are bonded by ultrasonic welding, there has been a case where the resin melted at the interface remains at the interface, and consequently the control of the thickness of the interface is difficult or the bonding strength is not stable.

In contrast, in Japanese Unexamined Patent Application Publication (JP-A) No. H10-156555, there is disclosed a welding method for bracket parts in which a melting portion and a groove running along the melting portion are formed on a welding surface of a bracket part made of resin, the welding surface is brought into contact with a surface of a base material, and vibration with pressure is applied to the melting portion from the back side of the welding surface of the bracket part. In the welding method, although the molten resin that has melted out diffuses and flows into the groove and part of the molten resin flows out to the surface of the bracket part, the molten resin that has melted out is forcedly poured into the groove by a ring-like planar portion of a recess provided on an ultrasonic horn. Thereby, the melting surface of the melting portion and the molten resin that has filled the interior of the groove become substantially flush with each other, and the molten resin exhibits a function as an adhesive and the bracket part is integrated with the base material by welding.

However, the groove illustrated in the welding method for bracket parts described in JP-A No. H10-156555 is a ring-like groove surrounding the periphery of the melting portion, a groove of a configuration in which grooves are further extended radially from a ring-like groove, or grooves extending radially around the melting portion. That is, in the welding method described in JP-A No. H10-156555, a margin for escape of the surplus molten resin produced at the interface during welding is ensured by providing a relatively large groove; however, when the groove is too large, an area where the bonding between the parts by using resin is insufficient may occur even in the area where the molten resin flows in.

Specifically, even in the area where the molten resin flows in, when the groove is too large, there is a concern that the molten resin is not completely charged into the space between the bottom of the groove and the surface of the base material of the bonding object, and the bonding strength is not enhanced. Therefore, although the thickness of the interface can be reduced, there is a concern that the molten resin is not stuck to the mutual parts while contributing to the bonding strength.

Specifically, in the case of a member made of fiber-reinforced resin, grade of a bonding target surface is easily varied, and it is difficult to stabilize a position and an amount of molten resin produced when resin members are overlapped with each other and bonded by ultrasonic welding. Accordingly, there is a concern that the welding process and bonding strength become unstable.

SUMMARY OF THE INVENTION

Accordingly, in a nod to the above described problems, the present invention proposes a resin member capable of controlling a position and an amount of molten resin produced during the ultrasonic welding, and stabilizing the thickness of the interface so as to stabilize the bonding strength.

An aspect of the present invention provides a resin member that contains a thermoplastic resin and is bonded to another resin member by ultrasonic welding, the resin member including projections that are projected from a surface of a bonding target section of the resin member and melted by application of contact pressure during the ultrasonic welding. The projections include projections having different projection heights from the surface of the bonding target section.

Among the projections, a projection height of at least one central projection disposed at a center of the bonding target section may be higher than projection heights of surrounding projections disposed around the center.

The at least one central projection may include at least three central projections.

The surrounding projections may have different distances from the center. Among the surrounding projections, a projection height of at least one surrounding projection near the center may be higher than a projection height of at least one surrounding projection away from the center.

The surrounding projections may include at least three surrounding projections.

The surrounding projections may be disposed around the center at equal intervals.

DETAILED DESCRIPTION

Figure 1:
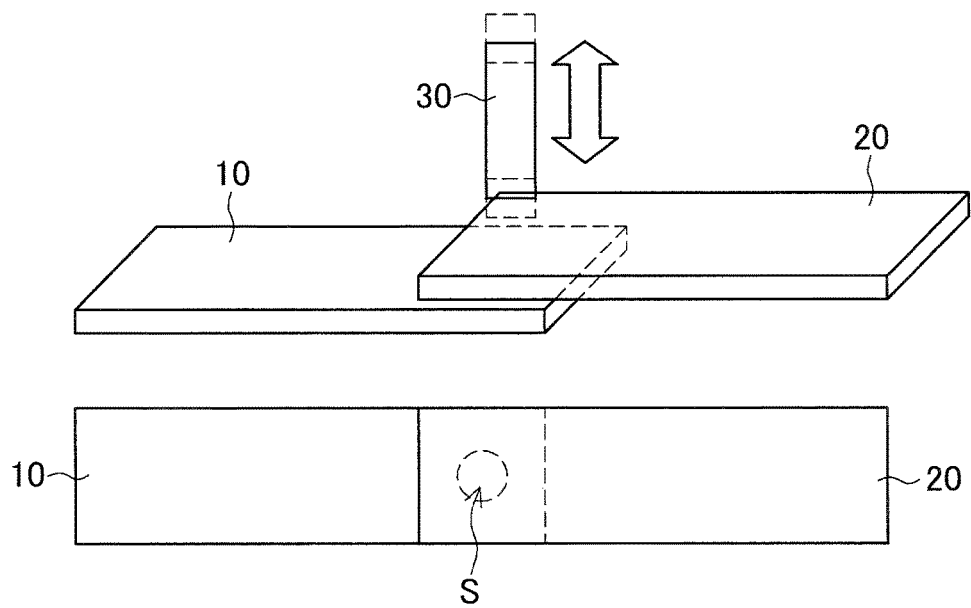
FIG. 1 is an explanatory diagram illustrating resin members bonded by ultrasonic welding.

Hereinafter, a preferred example of the present invention will be described in detail with reference to the appended drawings. Note that, in this specification and the appended drawings, structural elements that have substantially the same function and structure are denoted with the same reference numerals, and repeated description of these structural elements is omitted. Note that, in this specification and the drawings, structural elements that have substantially the same function and structure are sometimes distinguished from each other using different alphabets after the same reference numeral. However, when there is no need in particular to distinguish structural elements that have substantially the same function and structure, the same reference numeral alone is attached.

<1. Resin Member>

First, the configuration of a resin member according to an example of the present invention is described. The resin member is a member that is bonded to a bonding target member by ultrasonic welding. The ultrasonic welding is performed by, for instance as illustrated in FIG. 1, supporting a first resin member 10 and a second resin member 20 while making bonding target sections S of the both members 10 and 20 face each other and pressing a tip 30 of an ultrasonic vibrator from a surface of the second resin member 20 on the opposite side to the bonding surface. The resin member according to the present example may be used as at least one of the first resin member 10 disposed at a lower side during the ultrasonic welding and the second resin member 20 disposed at an upper side during the ultrasonic welding. A case where the present invention is applied to the first resin member 10 disposed at the lower side is explained below.

(1-1. Constituent Material)

The resin member is not particularly limited to the extent that it is used for ultrasonic welding and is a resin member containing a thermoplastic resin. For instance, the resin member may be a member that is made of a fiber-reinforced resin used for parts for automobile bodies. In the case of a member made of a fiber-reinforced resin, the reinforcing fibers used are not particularly limited; for instance, ceramic fibers such as carbon fibers and glass fibers, organic fibers such as aramid fibers, and reinforcing fibers made of a combination thereof may be used. In particular, carbon fibers are preferably contained from the viewpoints of high mechanical properties, the ease of strength design, etc.

As a main component of the matrix resin of the fiber-reinforced resin that forms the first resin member 10, for instance, thermoplastic resins such as a polyethylene resin, polypropylene resin, polyvinyl chloride resin, ABS resin, polystyrene resin, AS resin, polyamide resin, polyacetal resin, polycarbonate resin, thermoplastic polyester resin, polyphenylene sulfide (PPS) resin, fluorine resin, polyetherimide resin, polyetherketone resin, and polyimide resin are illustrated. One or a mixture of two or more of these thermoplastic resins may be used. These thermoplastic resins may be a single kind, a mixture, or a copolymer. In the case of a mixture, a compatibilizing agent may be used in combination. In addition, a bromine-based fire retardant, a silicon-based fire retardant, red phosphorus, etc. may be added as a fire retardant.

In this case, as the thermoplastic resin used, for instance, resins such as a polyolefin-based resin such as polyethylene and polypropylene, a polyamide-based resin such as nylon 6 and nylon 66, a polyester-based resin such as polyethylene terephthalate and polybutylene terephthalate, a polyetherketone, a polyethersulfone, and an aromatic polyamide are given.

(1-2. Configuration of Bonding Target Section)

Figure 2:
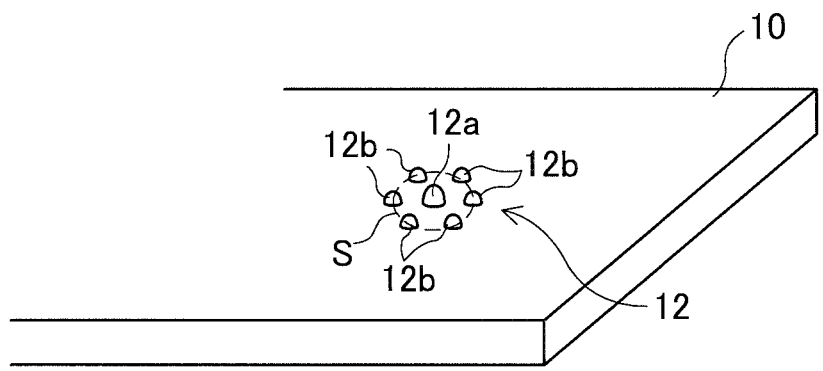
FIG. 2 is a perspective view illustrating a configuration of a resin member according to the present example.
Figure 3:
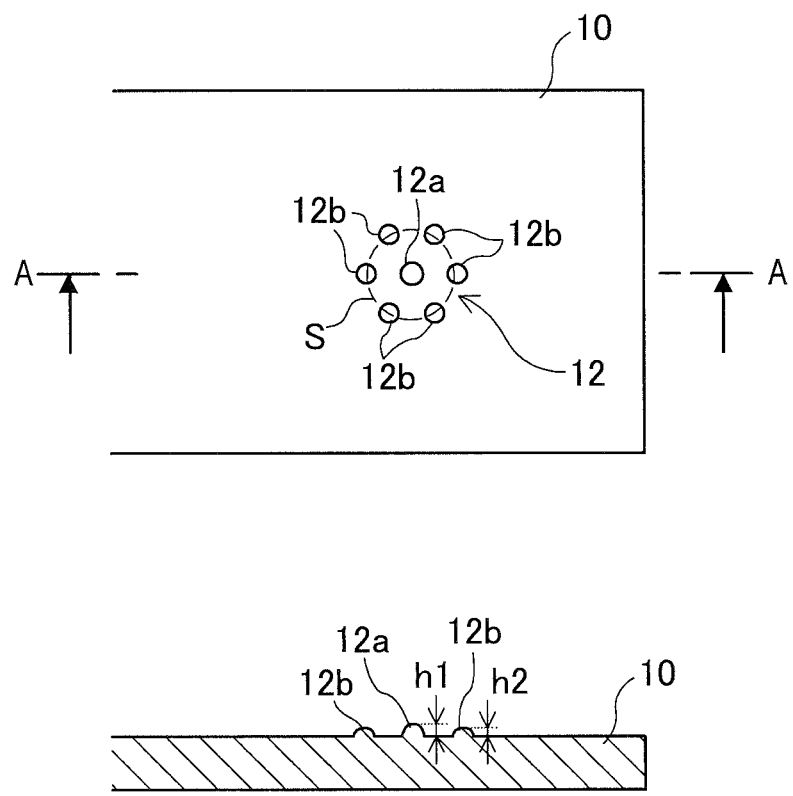
FIG. 3 is a plan view and cross-sectional view illustrating the configuration of the resin member according to the present example.
Figure 4:
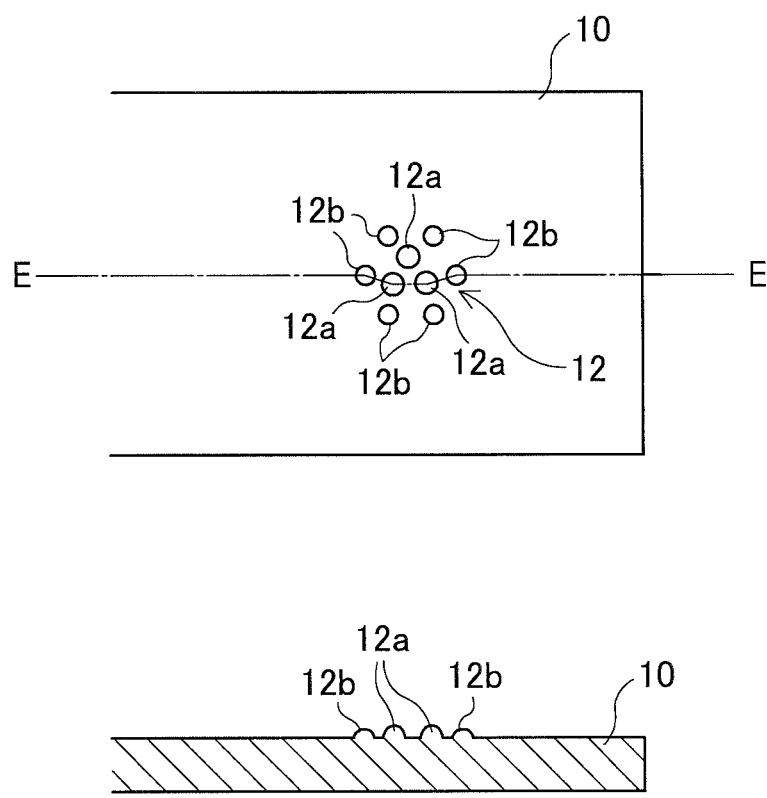
FIG. 4 is an explanatory diagram illustrating an instance of a resin member including central projections.

FIGS. 2 to 4 are each an explanatory diagram illustrating the bonding target section S of the first resin member 10. FIG. 2 is a perspective view of the first resin member 10. FIG. 3 is a plan view and cross-sectional view of the first resin member 10. The cross-sectional view in FIG. 3 is a diagram of the AA cross section in the plan view as viewed in the arrow direction. The illustrated first resin member 10 has a plate-like shape, but the first resin member 10 is not limited to the plate-like shape but may be in various shapes.

The bonding target section S is an area that is disposed facing the second resin member 20 and is bonded to the second resin member 20 during ultrasonic welding. To the bonding target section S, contact pressure is applied by the tip 30 of the ultrasonic vibrator during ultrasonic welding. The illustrated bonding target section S has a circular shape. The external shape and size of the bonding target section S correspond to the external shape and size of the tip 30 of the ultrasonic vibrator (see FIG. 1).

The bonding target section S includes projections 12 projected from a surface toward the second resin member 20 side. The projections 12 include a central projection 12a and surrounding projections 12b. The projections 12 are portions that may come in contact with the second resin member 20 during the ultrasonic welding, the second resin member 20 being disposed to face the projections 12. The projections 12 are melted by frictional heat generated when ultrasonic vibration is applied, and bonded to a molten resin of the second resin member 20.

The central projection 12a is provided at the center of the bonding target section S. The projection height h1 of the central projection 12a from the surface of the first resin member 10 is higher than the projection heights h2 of the surrounding projections 12b. During the ultrasonic welding, contact pressure is first applied to the central projection 12a. In other words, the central projection 12a is a melting start position. A molten resin produced by the molten central projection 12a flows out to a space between the central projection 12a and the surrounding projections 12b around the central projection 12a. Because the first resin member 10 includes the central projection 12a having the relatively high projection height h1, it is possible to ensure the bonding using the molten resin at the center of the desired bonding target section S.

The projection height h1 of the central projection 12a may be in a range of 0.1 to 3.0 mm, for instance. If the projection height h1 is too high, excessive amount of the molten resin is produced. Accordingly, the thickness of the interface between the first resin member 10 and the second resin member 20 easily increases, or easily becomes uneven. On the other hand, if the projection height h1 is too low, a difference between the projection height h1 and the projection heights h2 of the surrounding projections 12b reduces, and it may be difficult to start to melt the central projection 12a first. Hence, the projection height h1 of the central projection 12a is preferably in a range of 0.15 to 2.5 mm, and more preferably in a range of 0.2 to 2.0 mm The surrounding projections 12b are provided around the central projection 12a. In the first resin member 10 according to the present example, six surrounding projections 12b are disposed around the central projection 12a at equal intervals. The projection heights h2 of the surrounding projections 12b from the surface of the first resin member 10 are lower than the projection height h1 of the central projection 12a. The surrounding projections 12b are not in contact with the second resin member 20 when the ultrasonic welding is started. After the upper end part of the central projection 12a is melted, the surrounding projections 12b come in contact with the second resin member 20. In other words, the surrounding projections 12b start to melt after the central projection 12a starts to melt.

The central projection 12a allows bonding using the molten resin at the center of the desired bonding target section S, and the surrounding projections 12b ensure a desired bonding area using the molten resin. A molten resin produced by the molten surrounding projections 12b flows out to a space between the surrounding projections 12b. The molten resin produced by the molten central projection 12a may also flow out to the space between the surrounding projections 12b. Accordingly, a margin for escape of the molten resin is ensured, and the molten resin does not remain in a narrow range. Hence, it is possible to reduce unevenness of the interface between the bonding part of the first resin member 10 and the bonding part of the second resin member 20.

In this case, because the projections 12 to be melted include the central projection 12a and the surrounding projections 12b disposed around the central projection 12a, the produced molten resin successively flows out to the outside while being intercepted by the surrounding projections 12b. In this way, the molten resin easily flows evenly in all regions in the bonding target section S. Hence, it is possible to easily bond the first resin member 10 and the second resin member 20 at the center of the bonding target section S, and it is possible to reduce unevenness in the bonding position.

The projection heights h2 of the surrounding projections 12b may be in a range of 0.01 to 2.9 mm, for instance. If the projection heights h2 are too high, it is necessary to further increase the projection height h1 of the central projection 12a. Accordingly, the thickness of the interface between the first resin member 10 and the second resin member 20 easily increases, or easily becomes uneven. On the other hand, if the projection heights h2 are too low, the margin for escape of the produced molten resin reduces, and the molten resin remains easily. Accordingly, the thickness of the interface between the first resin member 10 and the second resin member 20 easily increases, or easily becomes uneven.

Hence, the projection heights h2 of the surrounding projections 12b are preferably in a range of 0.05 to 2.0 mm, and more preferably in a range of 0.1 to 1.5 mm.

The surrounding projections 12b are preferably disposed around the central projection 12a at equal intervals. When the surrounding projections 12b are disposed around the central projection 12a at equal intervals, it is possible to suppress tilt of the first resin member 10 and the second resin member 20, after the contact pressure is applied by the tip 30 of the ultrasonic vibrator and the central projection 12a is melted. Therefore, it is possible to evenly apply the contact pressure to the bonding target section S. In addition, when the surrounding projections 12b are disposed around the central projection 12a at equal intervals, it is possible to suppress variations in the amount of the molten resin depending on positions in the bonding target section S. Hence, it is possible to easily bond the first resin member 10 and the second resin member 20 at the center of the bonding target section S, and it is possible to reduce unevenness in the bonding position.

As illustrated in FIG. 3, the central projection 12a of the first resin member 10 is one projection provided at the center of the bonding target section S. However, a plurality of central projections 12a may be provided. In this case, it is preferable that at least three or more central projections 12a are provided so as to stabilize a supporting state of the second resin member 20 mounted on the first resin member 10 to face the first resin member 10 when the ultrasonic welding is started. In the case where three or more central projections 12a are used, it is possible to suppress tilt of the second resin member 20 and start melting from the central projections 12a when the tip 30 of the ultrasonic vibrator is pressed. Note that, in the case where one or two central projections 12a are used, it is only necessary to use a jig or the like that supports the second resin member 20 so as to prevent the tilt of the second resin member 20.

FIG. 4 is a plan view and cross-sectional view of the first resin member 10 having projections 12, the projections 12 including three central projections 12a. The cross-sectional view in FIG. 4 is a diagram of the EE cross section in the plan view as viewed in the arrow direction. The three central projections 12a are disposed at the center of the bonding target section S at equal intervals. Accordingly, the second resin member 20 is stably held on the first resin member 10 during ultrasonic welding. In this way, contact pressure is evenly applied to the three central projections 12a via the second resin member 20 from the time when the melting is started. Hence, the three central projections 12a start to melt evenly. In this case, three or more central projections 12a are not necessarily disposed at completely equal intervals. The central projections 12a are preferably disposed to suppress tilt of the first resin member 10 or the second resin member 20 during the ultrasonic welding.

In the instance illustrated in FIG. 3, six surrounding projections 12b are disposed around the central projection 12a at equal intervals. However, the number of surrounding projections 12b is not particularly limited. However, to evenly apply contact pressure to the bonding target section S of the first resin member 10 and the second resin member 20 during the ultrasonic welding, it is preferable to dispose at least three surrounding projections 12b around the central projection 12a at equal intervals. In this case, three or more surrounding projections 12b are not necessarily disposed at completely equal intervals. The surrounding projections 12b are preferably disposed to suppress tilt of the first resin member 10 or the second resin member 20 during the ultrasonic welding.

Figure 5:
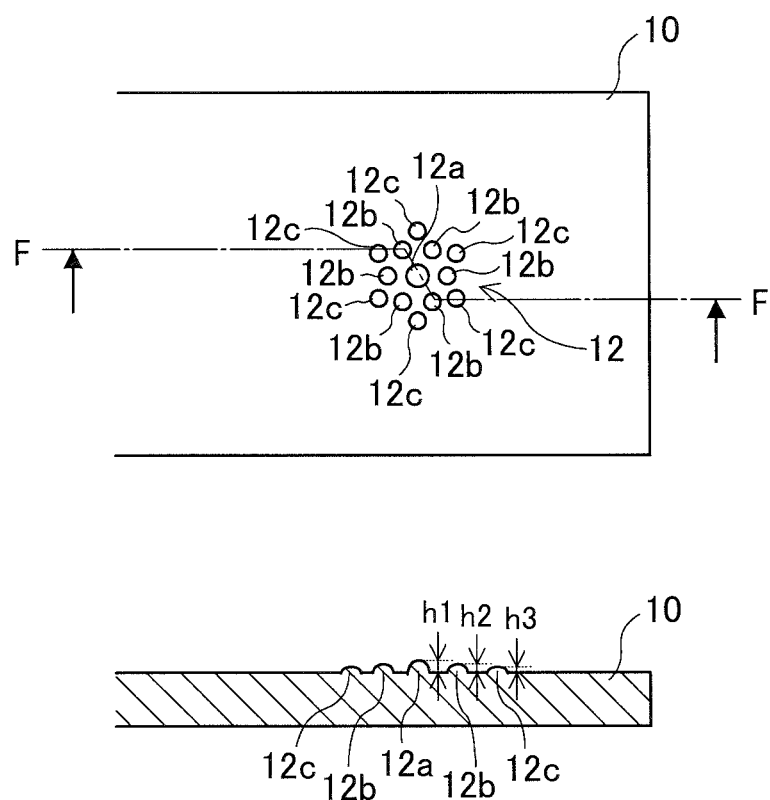
FIG. 5 is an explanatory diagram illustrating an instance of surrounding projections formed in a double circle shape.

In the instance illustrated in FIG. 3, the surrounding projections 12b are disposed in a single circle shape around the center of the bonding target section S. Alternatively, the surrounding projections 12b may be disposed in a double or more circle shape. FIG. 5 is a plan view and cross-sectional view of the first resin member 10 having surrounding projections 12b and 12c disposed in a double circle shape around the central projection 12a. The cross-sectional view in FIG. 5 is a diagram of the FF cross section in the plan view as viewed in the arrow direction. The surrounding projections 12c are provided at positions farther away from the central projection 12a than the surrounding projections 12b are. The surrounding projections 12b are six projections disposed around the central projection 12a at equal intervals. The surrounding projections 12c are six projections disposed around the surrounding projections 12b at equal intervals.

The projection height h1 of the central projection 12a is higher than the projection heights h2 and h3 of the surrounding projections 12b and 12c. The projection heights h2 of the surrounding projections 12b nearer to the central projection 12a are higher than the projection heights h3 of the surrounding projections 12c farther away from the central projection 12a. Accordingly, during the ultrasonic welding, the central projection 12a is melted first, the surrounding projections 12b are melted, and subsequently the surrounding projections 12c are melted. Hence, a molten resin is produced successively from the center of the bonding target section S toward the periphery, and it is possible to easily bond the first resin member 10 and the second resin member 20 at the center of the bonding target section S. As a result, it is possible to reduce unevenness in the thickness of the interface and variation in the bonding position.

A distance between the surrounding projections 12b (12c) and a distance between the surrounding projections 12b and the central projection 12a (distance between end parts) are preferably in a range of 1.0 to 15.0 mm. If the distance is too short, the margin for escape of the molten resin is blocked, and the molten resin remains easily. On the other hand, if the distance is too long, there is a lack of the molten resin in the interface between the first resin member 10 and the second resin member 20, and there is a concern that the thickness of the interface becomes uneven. Accordingly, the distance between the surrounding projections 12b (12c) and the distance between the surrounding projections 12b and the central projection 12a are preferably in a range of 1.0 to 10.0 mm, and more preferably in a range of 1.0 to 5.0 mm.

Figure 6:
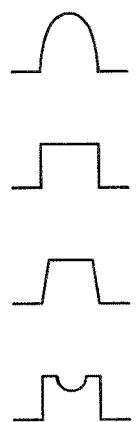
FIG. 6 is an explanatory diagram illustrating instances of a cross-sectional shape of a projection.

Cross-sectional shapes of the projections 12 when being cut along the height direction of the projections 12 including the central projection 12a and the surrounding projections 12b (12c) are not particularly limited. For instance, as illustrated in FIG. 6, the cross-sectional shape of the projection 12 may be any of various shapes such as a semi-elliptical shape, a rectangular shape, a trapezoidal shape, and a combination thereof.

Figure 7:
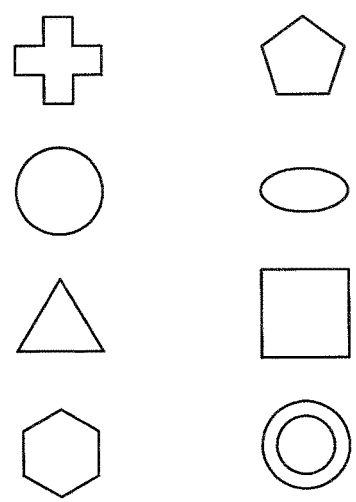
FIG. 7 is an explanatory diagram illustrating instances of a planar shape of a projection.

In addition, planar shapes of the projections 12 when viewed from above are not particularly limited. For instance, as illustrated in FIG. 7, the planar shape of the projection 12 may be any of various shapes such as a circular shape, an elliptical shape, a rectangular shape, a triangular shape, a polygonal shape, a cross shape, and a combination thereof.

<2. Method for Bonding Resin Members>

Hereinabove, the configuration of the first resin member 10 as a resin member according to the present example is described. Next, an instance of the method for bonding the first resin member 10 to the second resin member 20 by ultrasonic welding is described as a method for bonding resin members according to the present example.

(2-1. Ultrasonic Welding According to Present Example)

Figure 8:
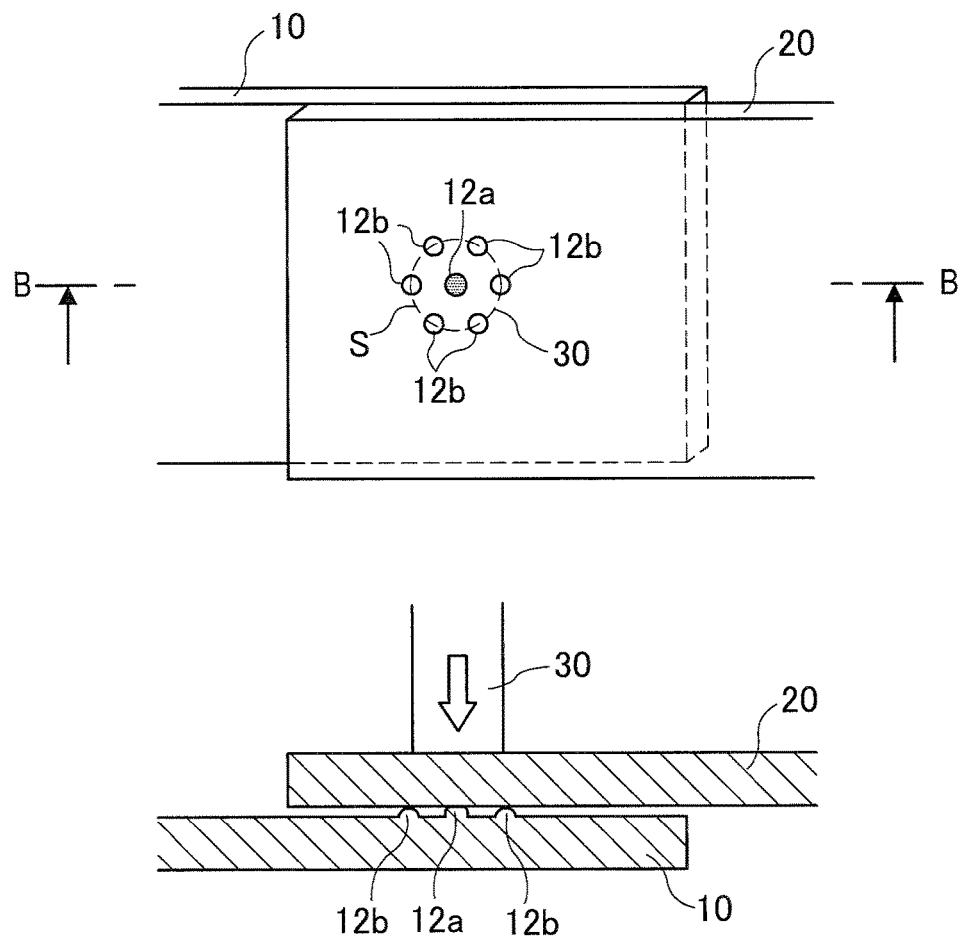
FIG. 8 is an explanatory diagram illustrating a method for bonding resin members according to the present example.
Figure 9:
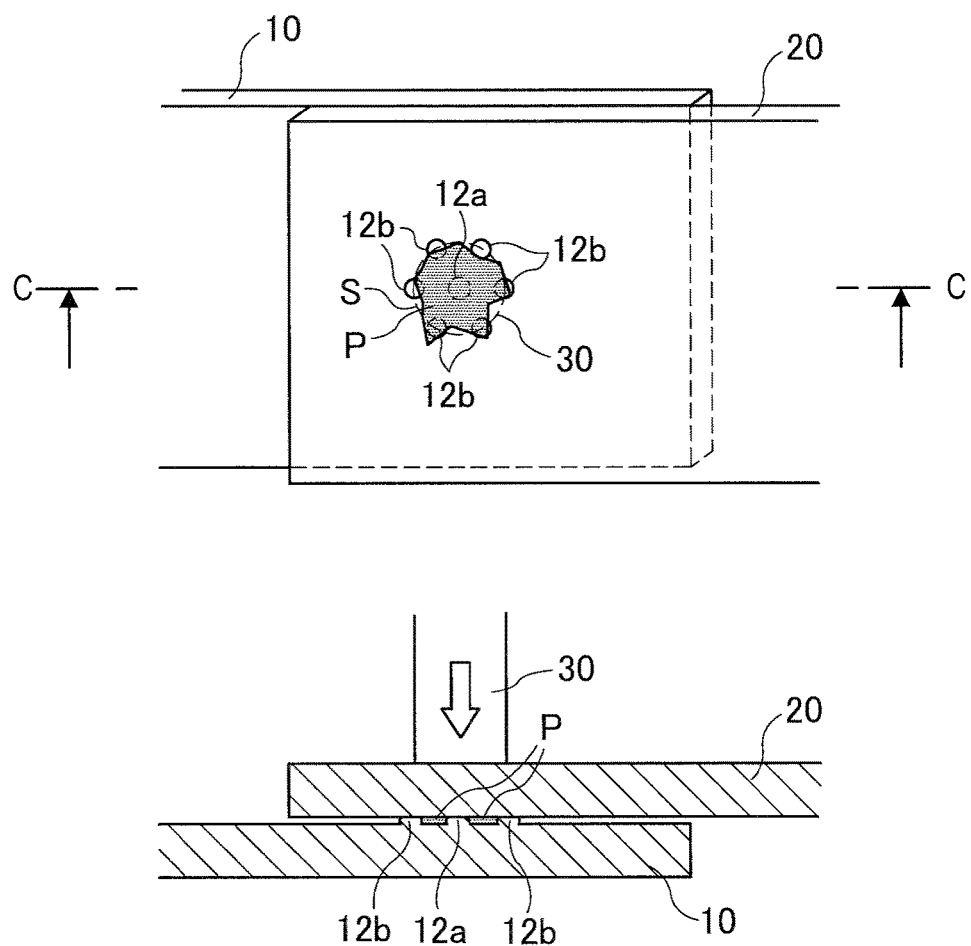
FIG. 9 is an explanatory diagram illustrating the method for bonding resin members according to the present example.
Figure 10:
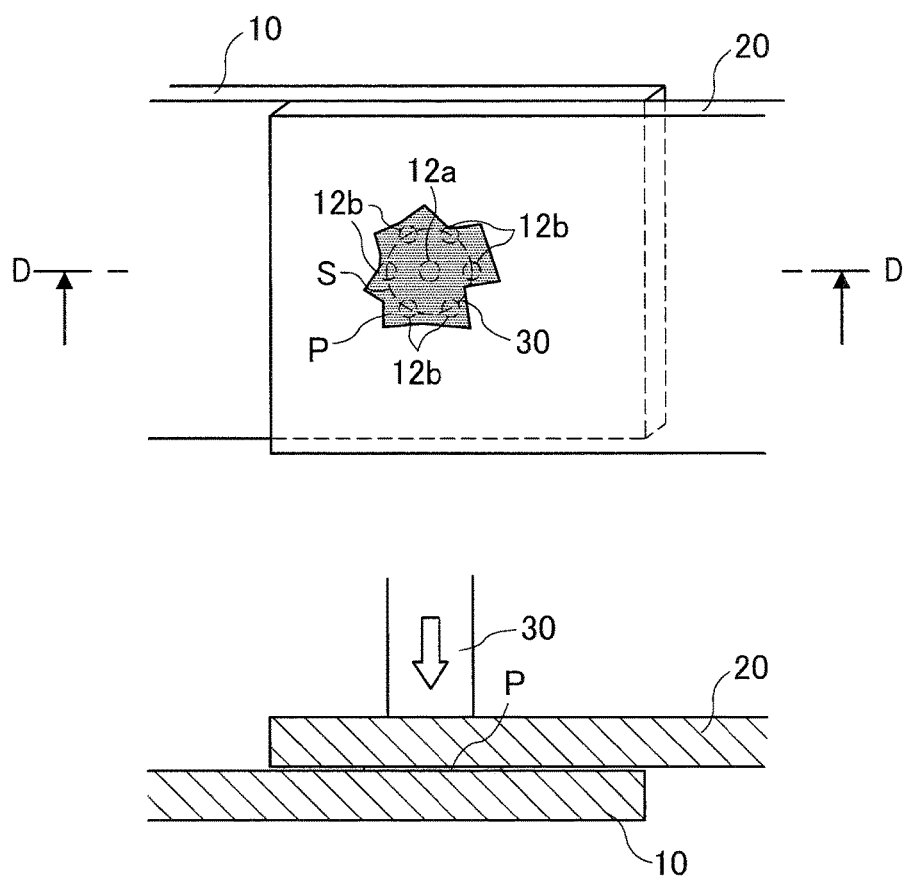
FIG. 10 is an explanatory diagram illustrating the method for bonding resin members according to the present example.

FIG. 8 to FIG. 10 are each an explanatory diagram illustrating the manner in which the first resin member 10 is bonded to the second resin member 20. In FIG. 8 to FIG. 10, a diagram of the first resin member 10 and the second resin member 20 overlapped with each other as viewed from the second resin member 20 side is illustrated on the upper side, and a cross-sectional view of the first resin member 10 and the second resin member 20 (a diagram of the BB cross section, the CC cross section, or the DD cross section as viewed in the arrow direction) is illustrated on the lower side.

The instance of the bonding method is an instance of the ultrasonic welding in which the tip 30 of the ultrasonic vibrator is pressed against a resin member and ultrasonic vibration is applied to the bonding target section S while contact pressure is applied to the bonding target section S so as to melt the thermoplastic resin; thus, the first resin member 10 and the second resin member 20 are welded. The end shape of the tip 30 used may be of a spot type having an acute shape, or may be of a plane type having a diamond-cut shape.

First, as illustrated in FIG. 8, the first resin member 10 having the projections 12 and the second resin member 20 are overlapped with each other while the bonding surfaces of the both members are made to face each other. In the illustrated instance, the second resin member 20 with its bonding surface facing down is held to be overlapped on the first resin member 10 that is mounted with its bonding surface facing up. The first resin member 10 and the second resin member 20 may be turned upside down. In the case where only one central projection 12a is provided, the second resin member 20 may be held using the jig (not illustrated) because the second resin member 20 mounted on the first resin member 10 has low stability.

In this state, the tip 30 is pressed against the position corresponding to the bonding target section S from the upper surface side of the second resin member 20 while ultrasonic vibration is applied. Consequently, among the projections 12 of the first resin member 10, the central projection 12a having the relatively high projection height h1 and a surface of the second resin member 20 in contact with the central projection 12a start to melt. As illustrated in FIG. 9, a molten resin P produced at this time flows into a space around the central projection 12a.

Further, the tip 30 is pressed against the second resin member 20 while ultrasonic vibration is applied; thus, the surrounding projections 12b included in the projections 12 of the first resin member 10 come in contact with the second resin member 20. Consequently, in addition to the continuously melting central projection 12a, the surrounding projections 12b and the surface of the second resin member 20 in contact with the surrounding projections 12b start to melt. At this time, the molten resin is produced evenly in all regions in the bonding target section S. The produced molten resin flows from the space between the surrounding projections 12b to the outside.

Then, after a predetermined time that is set beforehand has elapsed from when the tip 30 has started to be pressed against the second resin member 20, the tip 30 is raised; thus, the ultrasonic welding finishes. The molten resin P starts to cure in a state of being charged in the space between the first resin member 10 and the second resin member 20, and the interface between the bonding surface of the first resin member 10 and the bonding surface of the second resin member 20 is welded. As illustrated in FIG. 10, the thickness of the interface is made even in the bonding target section S by the molten resin P produced by melting the central projection 12a that is melted first, and by the molten resin P produced by subsequently melting the surrounding projections 12b. In the instance illustrated in FIG. 10, the molten resin P has flowed in to the surroundings of the bonding target section S.

As described above, by the ultrasonic welding using the first resin member 10 including the predetermined central projection 12a and surrounding projections 12b in the bonding target section S, it is possible to control a melting start position and an amount and position of produced molten resin so as to stabilize the thickness of the welding interface between the first resin member 10 and the second resin member 20. Hence, it is possible to stabilize the bonding strength between the first resin member 10 and the second resin member 20. In addition, because the surrounding projections 12b are provided around the central projection 12a, the margin for escape of the molten resin P is ensured, and the molten resin P is prevented from remaining in a narrow range. Accordingly, it is possible to suppress lifting of the first resin member 10 from the second resin member 20 by the molten resin P.

In addition, because the surrounding projections 12b are provided around the central projection 12a, resistance is conferred on the molten resin P flowing from the center of the bonding target section S to the outside, the molten resin P spreads in the bonding target section S, and the molten resin P surely contributes to the improvement in bonding strength. As described above, because the ultrasonic welding is carried out by using the resin members according to the present example, the thickness of the interface between the bonding surface of the first resin member 10 and the bonding surface of the second resin member 20 is stabilized, and the bonding strength between the first resin member 10 and the second resin member 20 is stabilized.

(2-2. Ultrasonic Welding According to Comparative Example)

Figure 11:
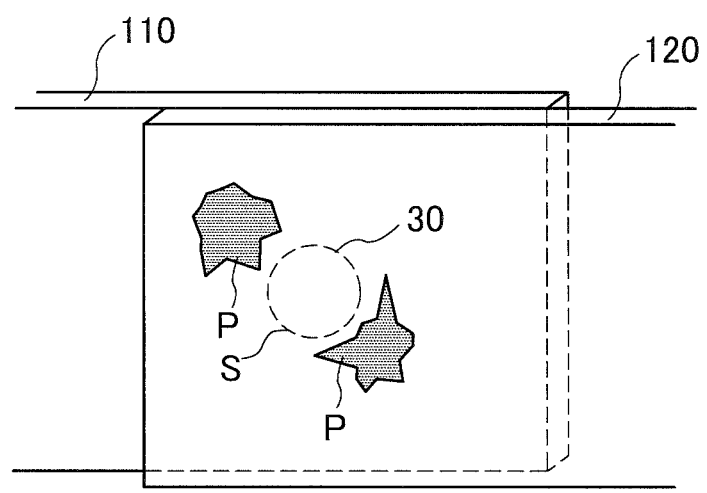
FIG. 11 is an explanatory diagram illustrating a method for bonding resin members according to a comparative example.
Figure 11:
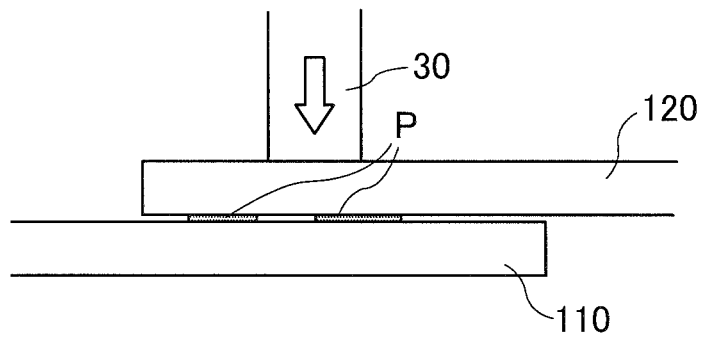

For comparison, a comparative example will now be described in which resin members that do not have projections in the bonding target sections S are bonded by ultrasonic welding. FIG. 11 is an explanatory diagram illustrating the manner in which a first resin member 110 is bonded to a second resin member 120 in the comparative example. In FIG. 11, a diagram of the first resin member 110 and the second resin member 120 overlapped with each other as viewed from the second resin member 120 side is illustrated on the upper side, and a side view of the first resin member 110 and the second resin member 120 is illustrated on the lower side.

In the comparative example, contact pressure is applied by the tip 30 of the ultrasonic vibrator in the state where a bonding surface of the first resin member 110 and a bonding surface of the second resin member 120 are overlapped with each other. In this case, because the bonding target section does not include any of the central projection and the surrounding projections, melting is started from any position in which the first resin member 110 and the second resin member 120 are in contact with each other. Specifically, in the case of a resin member having a relatively low surface grade such as fiber-reinforced resin, it is difficult to control a melting start position. Accordingly, as illustrated in FIG. 11, sometimes the melting starts in a region around the bonding target section S.

In addition, because the molten resin P is produced in the state where the bonding target surface of the first resin member 110 and the bonding target surface of the second resin member 120 are in contact with each other, there is no margin for escape of the molten resin P, and the first resin member 110 is easily lifted from the second resin member 120 by the molten resin P. Accordingly, in the comparative example, the molten resin P serves as an adhesive between the first resin member 110 and the second resin member 120. However, the thickness of the interface between the first resin member 110 and the second resin member 120 becomes uneven, and the bonding strength becomes unstable.

<3. Effect>

The resin member (first resin member 10) according to the present example described above includes the projections 12 in the bonding target section S, the projections 12 including the central projection 12a and the surrounding projections 12b. Among the projections 12, the projection height h1 of the central projection 12a provided at the center of the bonding target section S is higher than the projection heights h2 of the surrounding projections 12b provided around the central projection 12a. Hence, it is possible to specify the melting start position when the ultrasonic vibrator applies contact pressure.

In addition, because the surrounding projections 12b are provided to surround a periphery of the central projection 12a, the molten resin P is produced successively from the center to the periphery of the bonding target section S. At this time, the margin for escape of the molten resin P is formed by the central projection 12a and the surrounding projections 12b, and thereby the molten resin P easily spreads in all regions in the bonding target section S. In this way, the thickness of the interface between the first resin member 10 and the second resin member 20 in the bonding target section S stably becomes even, and the bonding strength between the first resin member 10 and the second resin member 20 becomes stable.

By using the resin member (first resin member 10) according to the present example, it is possible to control an amount of the molten resin P produced during the ultrasonic welding by adjusting sizes or the number of the central projections 12a and the surrounding projections 12b. Accordingly, even in the case where bonding surfaces have low smoothness or have complicated shapes, it is possible to stabilize the thickness of the interface between the bonding surfaces of the resin members, and the bonding strength between the resin members.

Although the preferred example of the present invention has been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A first resin member, comprising:
   a base having a flat surface having an elevation, the flat surface comprising a center position, and
   a plurality of projections projected from the flat surface of the base and rising above the elevation,
   wherein the flat surface and the plurality of projections bond the first resin member to a second resin member,
   wherein the plurality of projections melt by contact pressure in an ultrasonic welding process,
   wherein the flat surface and the plurality of projections comprise a thermoplastic resin,
   wherein the plurality of projections include:
      a plurality of central projections arranged around the center position of the flat surface of the first resin member, wherein each central projection is equidistant from the center position, and wherein a distance between each adjacent pair of central projections is the same, and surrounding projections located further from the center position than the plurality of central projections are located:
    wherein the flat surface of the first resin member comprises a region at the elevation, the region is located within a boundary defined by a circle having its center at the center position of the first resin member and its radius equal to a shortest distance between the center position and one of the plurality of central projections;
    wherein the plurality of central projections has a first projection height highest among the plurality of projections.

2. The first resin member according to claim 1, wherein, among the plurality of projections, the first projection height of each central projection is higher than projection heights of the surrounding projections.

3. The first resin member according to claim 1,
    wherein among the surrounding projections, any first surrounding projection that is more proximal to the center position has a projection height greater than that of a second surrounding projection that is more distal to the center position compared to the first surrounding projection.

4. The first resin member according to claim 2,
    wherein among the surrounding projections, any first surrounding projection that is more proximal to the center position has a projection height greater than that of a second surrounding projection that is more distal to the center position compared to the first surrounding projection.

5. The first resin member according to claim 1, wherein the surrounding projections comprise a subset of surrounding projections, wherein each surrounding projection of the subset of surrounding projections is equidistant from the center position, and wherein a distance between each adjacent pair of surrounding projections from the subset of surrounding projections is the same.

6. The first resin member according to claim 2, wherein the surrounding projections comprise a subset of surrounding projections, wherein each surrounding projection of the subset of surrounding projections is equidistant from the center position, and wherein a distance between each adjacent pair of surrounding projections from the subset of surrounding projections is the same.

7. The first resin member according to claim 3, wherein the surrounding projections comprise a subset of surrounding projections, wherein each surrounding projection of the subset of surrounding projections is equidistant from the center position, and wherein a distance between each adjacent pair of surrounding projections from the subset of surrounding projections is the same.

8. The first resin member according to claim 4, wherein the surrounding projections comprise a subset of surrounding projections, wherein each surrounding projection of the subset of surrounding projections is equidistant from the center position, and wherein a distance between each adjacent pair of surrounding projections from the subset of surrounding projections is the same.

9. The first resin member according to claim 1, wherein the first resin member is a carbon fiber-reinforced plastic member.

10. The first resin member according to claim 2, wherein the first resin member is a carbon fiber-reinforced plastic member.

11. The first resin member according to claim 4, wherein the first resin member is a carbon fiber-reinforced plastic member.

12. The first resin member according to claim 3, wherein the first resin member is a carbon fiber-reinforced plastic member.

13. The first resin member according to claim 1, wherein a cross-sectional shape of each projection comprises rectangular shape or a dented rectangular shape.

14. The first resin member according to claim 1, wherein the first projection height of at least one central projection of the plurality of central projections is different from projection heights of the surrounding projections, wherein the first projection height of the at least one central projection is in a range of 0.1 mm to 3.0 mm, and wherein the projection heights of the surrounding projections are in a range from 0.01 mm to 2.9 mm.

15. The first resin member according to claim 1, wherein the surrounding projections comprises six projections which are arranged around the center position of the flat surface, wherein the six projections are equidistant from the center position, and wherein a distance between each adjacent pair of projections of the six projections is the same.

16. The first resin member according to claim 1, wherein the second resin member is stably held on the first resin member during the ultrasonic welding process by the plurality of central projections arranged around the center position.

17. A first resin member, comprising:
    a plurality of projections projected from a surface of an area of the first resin member, wherein the area bonds the first resin member to a second resin member, wherein the plurality of projections melt by contact pressure in an ultrasonic welding process,
    wherein the first resin member comprises a thermoplastic resin,
    wherein the plurality of projections include:
        a first set of six surrounding projections which are equidistant from a center position of the area of the first resin member, wherein the first set of six surrounding projections defines vertices of a first regular hexagon, and
        a second set of six surrounding projections which are equidistant from the center position of the area of the first resin member, wherein the second set of six surrounding projections defines vertices of a second regular hexagon,
    wherein a height of the first set of six surrounding projections is greater than a height of the second set of six surrounding projections,
    wherein a distance of each projection of the first set of six surrounding projections from the center position is less than a distance of each projection of the second set of six surrounding projections from the center position, and
    wherein no vertex of the first regular hexagon is collinear with a pair of opposing vertices of the second regular hexagon.

* * * * *